No. 859,075. PATENTED JULY 2, 1907.
E. KEMPSHALL.
TIRE.
APPLICATION FILED APR. 5, 1906. RENEWED MAY 9, 1907.
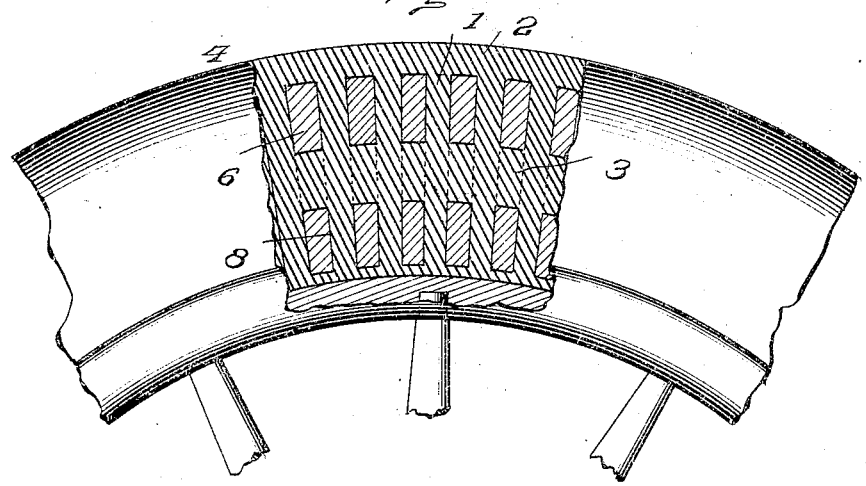
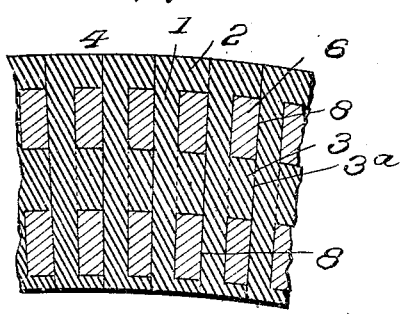
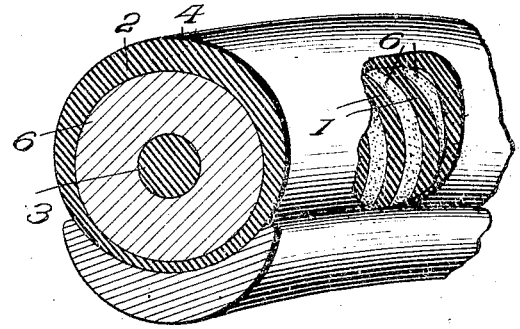
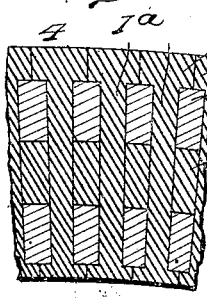
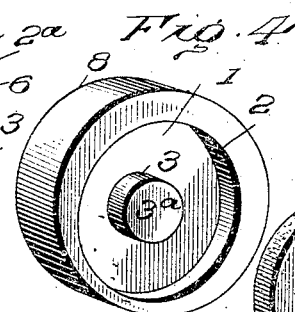
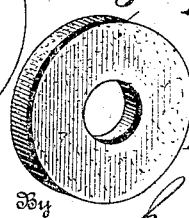
Witnesses
Inventor
Eleazer Kempshall
By
Attorney

UNITED STATES PATENT OFFICE.

ELEAZER KEMPSHALL, OF BOSTON, MASSACHUSETTS, ASSIGNOR TO KEMPSHALL TIRE COMPANY, OF BOSTON, MASSACHUSETTS, A CORPORATION OF MAINE.

TIRE.

No. 859,075.  Specification of Letters Patent.  Patented July 2, 1907.

Application filed April 5, 1906. Renewed May 9, 1907. Serial No. 372,763.

*To all whom it may concern:*

Be it known that I, ELEAZER KEMPSHALL, a citizen of the United States, residing at Boston, in the county of Suffolk and State of Massachusetts, have invented certain new and useful Improvements in Tires, of which the following is a specification.

This invention relates to improvements in vehicle tires, such as disclosed in my co-pending application No. 314,273, filed April 28, 1906.

In my present improvement, I provide transversely arranged cup-shaped resilient sections with plugs, and relatively non-resilient sections formed with openings to receive the plugs, and adapted to fit within the cup-shape resilient sections; the whole when assembled in tire form being vulcanized to bind the sections together. When the sections have thus been assembled and vulcanized, a tire is produced which possesses as its chief characteristic, a resilient core, and embedded non-resilient strengthening sections, the flanges of the cup-shape sections forming the outer covering. By such a construction a cheap and durable structure is the result, the details et cetera, and advantages thereof being pointed out in the description and claims.

In the drawings:—Figure 1 is a side elevation of a portion of a tire and wheel partially in section to disclose the invention. Fig. 2 is a detail sectional view of the tire before being vulcanized to bind the sections together. Fig. 3 is a perspective transverse section of my tire partially broken away, and mounted on a felly. Fig. 4 is a detail perspective view of a resilient section. Fig. 5 is a detail perspective view of a non-resilient section. Fig. 6 is a detail sectional view of a modification.

Referring to the drawings:—1 indicates a rubber section, provided with a surrounding outwardly extending flange 2, and a projection or plug 3. The flange 2 is slightly thicker on the outer edge to provide a tread 4 as will presently appear. A number of these sections are necessary in the formation of a tire, but as they are all alike, a description of one is sufficient for a thorough understanding of the invention.

Co-operating with and fitting within the flange 2 of each resilient section 1, is a relatively non-resilient section 6, of leather or like material, formed with a perforation to receive the plugs 3. The non-resilient sections are of such size and shape as to fit nicely within the flange 2, so that when the sections are assembled in tire form, the outer face of a non-resilient section will be flush with the outer face of the flange of the resilient section to squarely abut against the flat face 8 of the adjacent resilient section.

In the manufacture of tires constructed in accordance with my invention, the non-resilient sections 6, are fitted in the cup-shaped resilient sections and they are thus assembled side by side in tire form, and cemented together as shown, clearly in Fig. 2. After they are so assembled, the whole is subjected to a vulcanizing process to bind the resilient contacting faces together. That is, the faces of the flanges 2, and the faces 3ª of the plugs 3 are fused to the flat faces of the resilient sections 1. By this peculiar construction, separate covering for the sections is dispensed with, which is a considerable item of expense saved in the cost of manufacture, and at the same time the non-resilient sections of material, which, of course, are unaffected by the vulcanizing process, are securely embedded in rubber, and are prevented from lateral movement by the plugs. Furthermore, the plugs, after the vulcanizing process is completed provide a substantial core of resilient material. Obviously more than one core may be used if desired, as it may be preferable when constructing tires for heavy vehicles.

In Fig. 6, I have shown a slightly different form of my invention, in that the resilient sections 1ª, are formed on opposite sides with oppositely extending flanges to partially overlap the adjacent non-resilient sections. In this form of the invention it requires the flanges 2ª of two resilient sections to incase the alternate section of non-resilient material, however, the effect and result is exactly the same as heretofore described.

The invention is extremely simple, and affords a means of constructing a cheap and at the same time durable tire.

What I claim as new and desire to secure by Letters Patent is:—

1. A tire composed of alternate sections of resilient and non-resilient sections of material, flanges formed on the resilient sections to incase the non-resilient sections, said resilient sections being vulcanized to bind the sections together.

2. A tire composed of alternate sections of rubber and leather sections, flanges formed on the rubber sections to incase the leather sections, and means for binding the sections together.

3. A tire composed of alternate sections of resilient and non-resilient sections of material, the resilient sections having flanges which abut against an adjacent resilient section, the resilient sections being vulcanized and fused together at the points of contact.

4. A tire composed of alternate sections of rubber and leather sections, flanges formed on the rubber sections to incase the leather sections, said rubber sections being vulcanized to bind the sections together.

5. A tire composed of alternate sections of resilient and non-resilient sections of material, a flange formed on each resilient section, said flange inclosing the non-resilient section and abutting against the alternate resilient section and vulcanized thereto.

6. A tire composed of alternate sections of resilient and non-resilient sections of material, each resilient section of material having a flat surface and a flange extending in an opposite direction from the flat surface, said flange incasing the adjacent non-resilient section and abutting against the flat face of the alternate resilient section and vulcanized thereto.

7. A tire composed of alternate sections of resilient and non-resilient sections of material, the latter being formed with openings, flanges on the resilient sections to incase the non-resilient sections, resilient plugs fitting in the openings of the non-resilient sections, the resilient plugs and the flanges abutting against the alternate resilient sections and vulcanized thereto.

8. A tire composed of transverse alternately arranged resilient and non-resilient sections, the non-resilient sections having openings, a flange extending outwardly from each resilient section to incase the adjacent non-resilient section, and a plug formed with and extending outwardly from each resilient section to fit in the opening in the non-resilient section, the faces of the flanges and the plugs being vulcanized to bind the sections together.

9. A tire composed of sections of resilient material which abut at their outer edges and are vulcanized, and sections of non-resilient material embedded between the resilient sections.

10. A tire composed of sections of resilient material which abut at their outer edges, plugs connecting the resilient sections, sections of non-resilient material embedded between the resilient sections, the resilient sections being vulcanized and fused where they abut against each other.

In testimony whereof I have signed my name to this specification in the presence of two subscribing witnesses.

ELEAZER KEMPSHALL.

Witnesses:
ELIZABETH L. MACFATE,
JNO. IMIRIE.